(12) United States Patent
Schmitt et al.

(10) Patent No.: US 8,921,456 B2
(45) Date of Patent: Dec. 30, 2014

(54) INTUMESCENT COATING COMPOSITION WITH ENHANCED METAL ADHESION

(75) Inventors: Günter Schmitt, Darmstadt (DE); Peter Neugebauer, Limburg (DE); Sybille Scholl, Rodenbach (DE); Heike Heeb, Nauheim (DE); Peter Reinhard, Dreieich-Dreieichenhain (DE); Gilbert Kühl, Hanau (DE)

(73) Assignee: Evonik Röhm GmbH, Darmstadt (DE)

( * ) Notice: Subject to any disclaimer, the term of this patent is extended or adjusted under 35 U.S.C. 154(b) by 15 days.

(21) Appl. No.: 13/413,693

(22) Filed: Mar. 7, 2012

(65) Prior Publication Data

US 2012/0164462 A1  Jun. 28, 2012

Related U.S. Application Data

(62) Division of application No. 12/669,573, filed as application No. PCT/EP2008/058047 on Jun. 25, 2008.

(30) Foreign Application Priority Data

Jul. 20, 2007 (DE) .......... 10 2007 034 458

(51) Int. Cl.
| | |
|---|---|
| *C09K 21/14* | (2006.01) |
| *C08L 3/00* | (2006.01) |
| *C08K 5/34* | (2006.01) |
| *C08K 5/3477* | (2006.01) |
| *C08K 5/09* | (2006.01) |
| *C08K 5/05* | (2006.01) |
| *C08K 3/20* | (2006.01) |
| *C08K 3/26* | (2006.01) |
| *C08K 3/28* | (2006.01) |
| *C08K 3/30* | (2006.01) |
| *C08K 3/32* | (2006.01) |
| *C08K 3/38* | (2006.01) |
| *C09D 4/06* | (2006.01) |
| *C09D 5/18* | (2006.01) |

(52) U.S. Cl.
CPC . *C09D 4/06* (2013.01); *C09D 5/185* (2013.01)
USPC ............ 523/179; 524/47; 524/100; 524/101; 524/321; 524/387; 524/405; 524/414; 524/416; 524/423; 524/424; 524/428; 524/457; 524/464; 524/734; 524/769

(58) Field of Classification Search
USPC ............ 523/179; 524/47, 100, 101, 321, 387, 524/405, 414, 416, 423, 424, 428, 457, 464, 524/537.1, 734, 769
See application file for complete search history.

(56) References Cited

U.S. PATENT DOCUMENTS

| | | | |
|---|---|---|---|
| 4,145,477 A | 3/1979 | Smiley | |
| 6,479,574 B1 * | 11/2002 | Greigger et al. | ............... 524/414 |
| 2003/0211796 A1 | 11/2003 | Jahns et al. | |
| 2005/0209358 A1 | 9/2005 | Miller | |
| 2005/0217789 A1 * | 10/2005 | Eckstein et al. | ......... 156/244.11 |
| 2008/0224105 A1 | 9/2008 | Green et al. | |

FOREIGN PATENT DOCUMENTS

| | | |
|---|---|---|
| JP | 2 151669 | 6/1990 |
| WO | 2005 000975 | 1/2005 |
| WO | 2005 087875 | 9/2005 |

OTHER PUBLICATIONS

Office Action issued Dec. 26, 2013, in Taiwanese Patent Application No. 097126951 (with English-language Translation).

* cited by examiner

*Primary Examiner* — Kriellion Sanders
(74) *Attorney, Agent, or Firm* — Oblon, Spivak, McClelland, Maier & Neustadt, L.L.P.

(57) ABSTRACT

An intumescent coating composition and a process for curing the coating to obtain an intumescent coating is provided. The intumescent coating composition contains a thermoplastic polymer which comprises as a copolymerized component, an acid (meth)acrylate or a copolymerizable polyfunctional carboxylic acid; at least one ethylenically unsaturated monomer; an azo or organic peroxide initiator; an acid source; a carbon source; and a gas source.

19 Claims, No Drawings

INTUMESCENT COATING COMPOSITION WITH ENHANCED METAL ADHESION

CROSS REFERENCE TO RELATED APPLICATIONS

This application is a divisional application of prior U.S. patent application Ser. No. 12/669,573, filed Jan. 19, 2010, the disclosure of which is incorporated herein by reference in its entirety. The parent application is the National Stage of PCT/EP08/058047, filed Jun. 25, 2008, the disclosure of which is incorporated herein by reference in its entirety. The parent application claims priority to German Application No. 102007034458.0, filed Jul. 20, 2007, the disclosure of which is incorporated herein by reference in its entirety.

The invention relates to a resin system for an intumescent coating with improved metal adhesion.

Intumescent coatings are used to protect steel, and steel girders, from fire damage in construction. Conventional systems are provided with a variety of intumescent adjuvants, which when exposed to heat react together and form an insulating foam exhibiting low thermal conduction. This foam reduces the heating of the steel and so prolongs the time before the steel loses its supporting function. Additional evacuation time is gained.

Known coating systems are based on high molecular mass thermoplastic resins based on acrylates, methacrylates and/or vinyls and require a high solvent or water fraction for application to the corresponding metal surface. This leads to long drying times, in some cases very long, particularly when very thick coats are applied. For reasons of environmental protection, water-based coatings are being used increasingly, but require longer drying times, especially in regions with high atmospheric humidity.

The intumescent coating is typically applied on-site during the construction phase. Preference is given, however, to in-shop applications, since these can take place under controlled conditions. In the case of slow drying, however, an impractical cycle time results, because the components cannot be moved until drying is complete.

Epoxy-based intumescent coatings are used with preference in the offshore industry. They are distinguished by effective ageing stability and relatively short drying times. Polyurethane systems are a subject of intense investigation. They likewise feature a relatively short drying time and effective water resistance. Here, however, fire tests have had negative outcomes, owing to the poor adhesion of the coating to the steel [Development of alternative technologies for off-site applied intumescent coatings, Longdon, P. J., European Commission [Report] EUR (2005), EUR 21216, 1-141].

The object was to provide an improved resin for an intumescent coating.

The object, moreover, was to provide a process for the production of the resin.

The object has been achieved by a resin system for an intumescent coating comprising at least one ethylenically unsaturated monomer component, characterized in that there is at least one polymeric component comprising an acid (meth)acrylate or copolymerizable polyfunctionalized carboxylic acids present.

Surprisingly it has been found that the new resin system as a binder for intumescent coatings has outstanding adhesion properties to metallic surfaces, particularly to steel.

The resin system can also be used as a wood coating.

The coatings of the invention can be used both on-site and in-shop.

It has been found that the intumescent coatings comprising the new resins dry cure very quickly. Drying times of approximately 1 hour are achieved. Through the addition of more curing agents it is possible to lower the curing time further. Accordingly the preferred in-shop application can take place within acceptable cycle times.

It has been found, moreover, that the quick-drying and well-adhering resins for intumescent coatings are also outstandingly suitable for thick coating films, for example 1-5 mm.

Crosslinkers used are more particularly polyfunctional methacrylates such as allyl methacrylate, ethylene glycol dimethacrylate, diethylene glycol dimetacrylate, triethylene glycol dimethacrylate, tetraethylene glycol dimethacrylate, polyethylene glycol dimethacrylate, 1,3-butanediol dimethacrylate, 1,4-butanediol dimethacrylate, 1,6-hexanediol dimethacrylate, 1,12-dodecanediol dimethacrylate, glycerol dimethacrylate and trimethylolpropane trimethacrylate.

Resin systems for the coating of metal surfaces are known. Intumescent coatings are described in particular in WO 2005/000975.

The coating preferably comprises one thermoplastic polymer resin in combination with low molecular mass monomers or oligomers having ethylenically unsaturated double bonds, in the form for example of alpha-beta ethylenically unsaturated carboxylic ester groups such as methacrylate or acrylate groups, for example. The notation (meth)acrylate here denotes not only methacrylate, such as methyl methacrylate, ethyl methacrylate, etc., for example, but also acrylate, such as methyl acrylate, ethyl acrylate, etc., for example, and also mixtures of both.

One thermoplastic polymer is preferably a (meth)acrylate resin in the form of homopolymer, copolymer and/or terpolymer. With particular preference a polymer component is a (meth)acrylate polymer. This polymer can be prepared via the polymerization of one or more methacrylate or acrylate monomers, preferably from the group of methyl (meth)acrylates, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and/or 2-ethylhexyl (meth)acrylate. Co-reagents may be styrene or vinyltoluenes. One particularly preferred thermoplastic polymer is a copolymer of butyl methacrylate and methyl methacrylate.

One ethylenically unsaturated monomer component comprises at least one methacrylate or acrylate functionality.

One ethylenically unsaturated monomer component is preferably selected from the group of methyl (meth)acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and/or 2-ethylhexyl (meth)acrylate.

Another class of thermoplastic polymer resins comprises homopolymers, copolymers or terpolymers of vinyl monomers such as styrene, vinyltoluene, vinyl chloride, vinyl acetate, vinylidene chloride and/or vinyl esters. Co-reagents may be dienes, such as butadiene, for example.

The thermoplastic resins form 10%-60% by weight of the resin component of the coating mixture.

One polymeric component may comprise methyl (meth) acrylate, ethyl (meth)acrylate, n-butyl (meth)-acrylate, isobutyl (meth)acrylate, tert-butyl (meth)-acrylate, 2-hydroxyethyl (meth)acrylate, 2-hydroxypropyl (meth)acrylate and/or 2-ethylhexyl (meth)-acrylate.

One polymeric component may also comprise a reaction product of one or more dienes with at least one styrene, vinyltoluene, vinyl chloride, vinyl acetate, vinylidene chloride and/or vinyl ester.

At least one of the liquid monomer components comprises methacrylate functionalities, with particular preference methacrylic esters. If desired it is also possible for an acrylate functionality to be present, preferably acrylic esters.

Moreover, the monomer component is monofunctional, so that the reaction product with an organic peroxide is thermoplastic and melts and flows up to the reaction temperature of the intumescent additives.

By way of example (meth)acrylic esters are selected from the group of methyl (meth)acrylates, ethyl (meth)-acrylates, n-butyl (meth)acrylates, isobutyl (meth)-acrylates, tert-butyl (meth)acrylates, 2-ethylhexyl (meth)acrylates and mixtures thereof. Methyl methacrylate and 2-ethylhexyl acrylate are particularly preferred.

The liquid monomer component forms 30%-60% by weight of the resin component of the coating mixture.

The resin component forms 10%-60% by weight, with particular preference 25%-50% by weight, of the coating mixture.

Initiators are used in order to cure the liquid coating. Use is made of AZO initiators or organic peroxides. Preferred initiators used are dialkyl peroxides, keto peroxides, peroxy esters, diacyl peroxides, hydroperoxides and/or peroxy ketals. The initiator is used in amounts of 0.5% to 5%, with particular preference 1%-4% with respect to the overall resin composition.

When using dibenzoyl peroxide as initiator it is preferred to add a tertiary amine in order to accelerate curing. Preferred tertiary amines are N,N-dimethylanilines and N,N-dialkyl-p-toluidines.

The fraction of the tertiary amines as a proportion of the overall resin mixture is 0.1%-4%, preferably 0.25%-3%.

Preferred azo initiators are 2,2-azobis(amidinopropane)dihydrochloride, 2,2-azobis(2-methylbutyronitrile), 2,2-azobis(2-methylpropanenitrile), 2,2-azobis(2,4-di-methylpentanenitrile), and mixtures thereof.

A substantial improvement in the adhesion properties of the intumescent coating on metal surfaces is achieved through the addition of acid (meth)acrylates or copolymerizable polyfunctionalized carboxylic acids. The acid (meth)acrylates are preferably selected from the group of dicarboxylic acids, particular preference being given to the use of β-CEA. Copolymerizable polyfunctionalized carboxylic acids that can be used include all known multiply functionalized carboxylic acids, selection taking place with particular preference from the group of itaconic acids, fumaric acids and maleic acids.

Beta-CEA is the Michael product of acrylic acid and is always a mixture of:

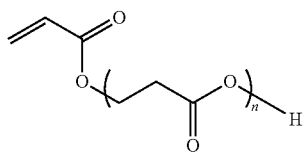

beta-carboxyethyl acrylate
where n = 1-20

The acid (meth)acrylates or copolymerizable polyfunctionalized carboxylic acids preferably form a part of the polymeric component of the resin.

These acid (meth)acrylates or copolymerizable polyfunctionalized carboxylic acids additionally have a good dispersing effect on the intumescent constituents used.

The object has also been achieved by a process for curing intumescent coatings comprising resin systems according to claim 1. The process of the invention is characterized in that at least one ethylenically unsaturated monomer component and at least one polymeric component comprising one acid (meth)acrylate or copolymerizable polyfunctionalized carboxylic acids and the customary intumescent auxiliaries and additives, are polymerized by means of free radical polymerization.

The intumescent coating comprises specific substances which when exposed to heat react with one another and form a foam for isolation. The coating is composed preferably of 3 components: an acid source, a carbon source and a gas source.

On exposure to heat, the resin component begins to melt. At higher temperatures the acid source is activated and is able to react with the other constituents of the coating. The acid source used is, for example, ammonium polyphosphates or polyphosphoric acids, which react with pentaerythritol (carbon source), for example, to form polyphosphoric ester. The breakdown of this ester leads to carbon compounds, which together with foaming agents such as melamine form the desired foam.

The intumescent coating ideally comprises at least one acid source such as ammonium polyphosphate, melamine phosphate, magnesium sulphate or boric acid, for example.

The intumescent coating mixture comprises a carbon source, such as pentaerythritol and dipentaerythritol and mixtures thereof, for example. Starch and expandable graphite are likewise suitable.

The intumescent coating mixture comprises a gas source, such as melamine, melamine phosphate, melamine borate, melamine-formaldehyde, melamine cyanurate, tris(hydroxyethyl)isocyanurate, ammonium polyphosphate or chlorinated paraffin, for example.

In addition there may be nucleating agents present. These may be, for example, titanium dioxide, zinc oxide, aluminium oxide, silicon, silicates, heavy metal oxides such as cerium oxide, lanthanum oxide and zirconium oxide, mica or loam.

Further adjuvants (e.g. zinc borate, glass beads, fibre materials, etc.) may be present in the intumescent coating mixture.

The fraction of the intumescent components as a proportion of the coating mixture is 40%-85%, preferably 50%-75%.

Thixotropic adjuvants can be used in order to improve the rheology, in order to make thick coatings possible in one application step. They are added in amounts of 0%-2%, preferably 0.05%-1%, based on the total amount of the coating.

It is also possible for wetting adjuvants or dispersion adjuvants to be added.

Prior to the application of the coating to the metallic surface the organic peroxide is added. This initiates the free-radical reaction in the course of which the liquid coating cures. Typically the cure time is 30 minutes. It can be varied through the amount of initiator and accelerator.

The coating can be applied by means of spraying technology, brush, roller, spatula or dipping process. As an alternative it is also possible to use a multi-component spraying system.

The metal surface is typically cleaned before the coating is applied, in order to remove processing residues and the like. In some cases primers are applied as well.

It is also possible to apply a topcoat, for exposed metal surfaces, for example. The thickness however, should only be between 15 μm and 250 μm, in order not to inhibit the intumescent reaction.

The outstanding adhesion properties allow the resin system for intumescent coatings, in accordance with the invention, to be applied to other surfaces in need of an intumescent coating. Surfaces of wood, for example, can also be coated.

EXAMPLES

Example 1

The resin system of the invention is processed using a Graco Extreme Mix Plural Component Spray System. This airless spray system uses 2 pumps, which with an inlet pressure of 0.35 MPa spray the mixture through the nozzle at approximately 19.3 MPa. The nozzle size is approximately 525-675 μm in diameter.

Typically 300 μm to 2000 μm are applied per coating pass. In these experiments, 6 coating passes, each with a thickness of approximately 1000 μm, were applied to the substrate. The substrate coated was Swedish standard Sa 2½ construction steel.

Adhesion to the Steel

The adhesion of the coating to the construction steel was determined using a PAT (precision adhesion test equipment, hydraulic adhesion tester) instrument.

An adhesion of on average 6.9 MPa was measured.

This figure meets the requirements for a construction steel coating which can be used industrially.

Comparative Example

A conventional resin system is processed using a Graco Extreme Mix Plural Component Spray System. This airless spray system uses 2 pumps, which with an inlet pressure of 0.35 MPa spray the mixture through the nozzle at approximately 19.3 MPa. The nozzle size is approximately 525-675 μm in diameter.

Typically 300 μm to 2000 μm are applied per coating pass. In these experiments, 6 coating passes, each with a thickness of approximately 1000 μm, were applied to the substrate. The substrate coated was Swedish standard Sa 2½ construction steel.

Adhesion to the Steel

The adhesion of the coating to the construction steel was determined using a PAT (precision adhesion test equipment, hydraulic adhesion tester) instrument.

An adhesion of on average 1.38 MPa was measured.

This FIGURE does not meet the requirements for a construction steel coating which can be used industrially.

The invention claimed is:

1. An intumescent coating composition, comprising:
   a thermoplastic polymer which comprises as a copolymerized component, an acid (meth)acrylate or a copolymerizable polyfunctional carboxylic acid such that at least one acid carboxylate group is pendant to the carbon-carbon chain of the thermoplastic polymer;
   at least one ethylenically unsaturated monomer;
   an azo or organic peroxide initiator;
   an acid source;
   a carbon source; and
   a gas source;
   wherein the thermoplastic polymer is a (meth)acrylate polymer or a polymer of at least one vinyl monomer selected from the group consisting of styrene, vinyltoluene, vinyl chloride, vinyl acetate, vinylidene chloride and a vinyl ester, and
   wherein the polymer of the vinyl monomer optionally comprises a diene component.

2. The intumescent coating composition according to claim 1, wherein the copolymerized component of the thermoplastic polymer is a copolymerizable polyfunctional carboxylic acid which is a dicarboxylic acid.

3. The intumescent coating composition according to claim 1, wherein the copolymerized component of the thermoplastic polymer is an acid (meth)acrylate which is a beta-carboxyethyl acrylate (beta-CEA) of formula:

$$\text{[structure shown]}$$

wherein n = 1-20.

4. The intumescent coating composition according to claim 1, wherein the copolymerized component of the thermoplastic polymer is a copolymerizable polyfunctional carboxylic acid which is selected from the group consisting of itaconic acid, fumaric acid and maleic acid.

5. The intumescent coating composition according to claim 1, wherein a content of the thermoplastic polymer, is from 10 to 60% by weight of the total weight of the intumescent coating composition.

6. The intumescent coating composition according to claim 1, wherein the thermoplastic polymer comprises a (meth)acrylate as a polymerized component.

7. The intumescent coating composition according to claim 6, wherein the thermoplastic polymer is a (meth)acrylate copolymer.

8. The intumescent coating composition according to claim 7, wherein the methacrylate copolymer comprises at least one monomer selected from the group consisting of methyl (meth)acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and 2-ethylhexyl (meth)acrylate.

9. The intumescent coating composition according to claim 1, wherein the thermoplastic polymer comprises as polymerized components: one or more dienes and at least one selected from the group consisting of styrene, vinyltoluene, vinyl chloride, vinyl acetate, vinylidene chloride and a vinyl ester.

10. The intumescent coating composition according to claim 1, wherein the at least one ethylenically unsaturated monomer is a methacrylate or an acrylate monomer.

11. The intumescent coating composition according to claim 1, wherein the at least one ethylenically unsaturated monomer is at least one monomer selected from the group consisting of methyl (meth)acrylate, ethyl (meth)acrylate, n-butyl (meth)acrylate, isobutyl (meth)acrylate, tert-butyl (meth)acrylate, 2 hydroxyethyl (meth)-acrylate, 2-hydroxypropyl (meth)acrylate and 2-ethylhexyl (meth)acrylate.

12. A process for curing the intumescent coating composition, according to claim 1, comprising:
   polymerizing the at least one ethylenically unsaturated monomer and the thermoplastic polymer wherein the polymerizing is a free radical polymerization.

13. The process for curing the intumescent coating composition according to claim 12, wherein the free radical polymerization is initiated by an organic peroxide.

14. The process for curing the intumescent coating composition according to claim 13, wherein the organic peroxide is selected from the group consisting of dialkyl peroxides, keto peroxides, peroxy esters, diacyl peroxides, hydroperoxides and peroxy ketals.

15. A coated substrate, comprising at least one surface coated with an intumescent coating obtained by curing the intumescent coating composition according to claim 1, wherein the substrate is metal or wood.

16. The intumescent coating composition according to claim 1, wherein the acid source is at least one selected from the group consisting of ammonium polyphosphate, a polyphosphoric acid, melamine phosphate, magnesium sulphate and boric acid.

17. The intumescent coating composition according to claim 1, wherein the carbon source is at least one selected from the group consisting of pentaerythritol, dipentaerythritol, starch and expandable graphite.

18. The intumescent coating composition according to claim 1, wherein the gas source is at least one selected from the group consisting of melamine, melamine phosphate, melamine borate, melamine-formaldehyde, melamine cyanurate, tris(hydroxyethyl)isocyanurate, ammonium polyphosphate and a chlorinated paraffin.

19. The intumescent coating composition according to claim 1, wherein a content of the acid source, carbon source and gas source is 40%-85% by weight of the intumescent coating composition.

* * * * *